(12) United States Patent
Kim

(10) Patent No.: US 11,678,071 B2
(45) Date of Patent: Jun. 13, 2023

(54) IMAGE SENSING DEVICE FOR ACQUIRING A LIGHT FIELD IMAGE

(71) Applicant: SK hynix Inc., Icheon-si (KR)

(72) Inventor: Jong Eun Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 124 days.

(21) Appl. No.: 17/069,674

(22) Filed: Oct. 13, 2020

(65) Prior Publication Data
US 2021/0314509 A1    Oct. 7, 2021

(30) Foreign Application Priority Data

Apr. 7, 2020  (KR) .................... 10-2020-0042330

(51) Int. Cl.
*H04N 23/957*    (2023.01)
*H04N 5/04*      (2006.01)
(Continued)

(52) U.S. Cl.
CPC .......... *H04N 23/957* (2023.01); *G02B 5/188* (2013.01); *G02B 5/1885* (2013.01); *G03B 5/02* (2013.01); *H04N 5/04* (2013.01); *H04N 23/68* (2023.01); *H04N 25/71* (2023.01); *H04N 25/76* (2023.01); *G03B 2205/0038* (2013.01)

(58) Field of Classification Search
CPC ............... H04N 5/22451; H04N 23/68; G03B 2205/0038; G03B 5/02; G03B 5/04; G02B 5/188; G02B 5/1885
See application file for complete search history.

(56) References Cited

U.S. PATENT DOCUMENTS

| 5,517,279 A * | 5/1996 | Hugle ................. G03F 7/70475 |
| | | 355/77 |
| 8,345,144 B1 * | 1/2013 | Georgiev ............. H04N 9/0451 |
| | | 359/368 |

(Continued)

FOREIGN PATENT DOCUMENTS

| CN | 102413340 A | 4/2012 | |
| CN | 103327223 A * | 9/2013 | ......... G02B 27/0075 |

(Continued)

OTHER PUBLICATIONS

Office Action for Chinese Patent Application No. 202011061445.2 dated Oct. 8, 2022.

*Primary Examiner* — David N Werner
(74) *Attorney, Agent, or Firm* — Perkins Coie LLP

(57) ABSTRACT

An image sensing device includes a pixel array configured to include a first pixel group and a second pixel group that are contiguous to each other, each of the first pixel group and second pixel group including a plurality of imaging pixels to convert light into pixel signals, and a light field lens array disposed over the pixel array to direct light to the imaging pixels and configured as a moveable structure that is operable to move between a first position and a second position in a horizontal direction by a predetermined distance corresponding to a width of the first pixel group or a width of the second pixel group, the light field lens array configured to include one or more lens regions each including a light field lens and one or more open regions formed without the light field lens to enable both light filed imaging and conventional imaging.

19 Claims, 17 Drawing Sheets

(51) Int. Cl.
*H04N 25/71* (2023.01)
*H04N 25/76* (2023.01)
*H04N 23/68* (2023.01)
*G02B 5/18* (2006.01)
*G03B 5/02* (2021.01)

(56) References Cited

U.S. PATENT DOCUMENTS

| | | | |
|---|---|---|---|
| 8,400,555 | B1 * | 3/2013 | Georgiev ........... H04N 5/22541 348/222.1 |
| 8,976,288 | B2 | 3/2015 | Ng et al. |
| 9,411,122 | B2 | 8/2016 | Bhat et al. |
| 9,794,460 | B1 | 10/2017 | Kim |
| 10,552,947 | B2 * | 2/2020 | Liang ................... G06F 3/04842 |
| 10,565,734 | B2 * | 2/2020 | Bevensee ........... H04N 5/36965 |
| 10,594,945 | B2 * | 3/2020 | Wang ................ H04N 5/22541 |
| 10,708,471 | B2 * | 7/2020 | Weissig ................ H04N 5/247 |
| 10,819,899 | B2 * | 10/2020 | Watanabe .......... H04N 5/22541 |
| 2004/0008411 | A1 * | 1/2004 | Freese ................. G02B 5/1885 359/460 |
| 2011/0085074 | A1 * | 4/2011 | Sonoda ................. G03B 7/095 348/E5.04 |
| 2013/0076930 | A1 | 3/2013 | Border et al. |
| 2013/0076931 | A1 * | 3/2013 | Border ............... H04N 5/232935 348/222.1 |
| 2013/0076966 | A1 * | 3/2013 | Border ............... H04N 5/22541 348/E5.045 |
| 2013/0222606 | A1 * | 8/2013 | Pitts ................... G02B 27/0018 348/187 |
| 2013/0321581 | A1 * | 12/2013 | El-Ghoroury ........ H04N 13/207 348/340 |
| 2014/0028869 | A1 * | 1/2014 | Hatakeyama ........ H04N 25/615 348/222.1 |
| 2014/0146201 | A1 * | 5/2014 | Knight ............... H04N 9/04557 348/222.1 |
| 2016/0044252 | A1 * | 2/2016 | Molina .................. H04N 23/70 348/208.6 |
| 2017/0118387 | A1 * | 4/2017 | Seifi ....................... G06T 3/4015 |
| 2017/0243373 | A1 * | 8/2017 | Bevensee ................ G06T 7/557 |
| 2018/0067237 | A1 * | 3/2018 | Vandame ............. G02B 3/0056 |
| 2019/0107688 | A1 * | 4/2019 | Nakajima .......... H04N 5/22541 |
| 2020/0077015 | A1 * | 3/2020 | Watanabe .......... H04N 5/22541 |
| 2021/0215855 | A1 * | 7/2021 | Yu ......................... G02B 3/0037 |

FOREIGN PATENT DOCUMENTS

| | | | | |
|---|---|---|---|---|
| CN | 105093472 | A * | 11/2015 | ......... G02B 27/0075 |
| CN | 107306343 | | 10/2017 | |
| CN | 109863602 | | 6/2019 | |
| CN | 110099205 | A * | 8/2019 | ........... H04N 13/204 |
| EP | 2536158 | A1 * | 12/2012 | ............. H04N 13/25 |
| EP | 2786696 | A1 * | 10/2014 | ............. A61B 1/00096 |
| EP | 2871830 | A1 * | 5/2015 | ............. G02B 3/005 |
| EP | 3104604 | A1 * | 12/2016 | |
| JP | 2012060460 | A * | 3/2012 | |
| JP | 2012060460 | A | 3/2012 | |
| KR | 10-1613682 | B | 4/2016 | |
| WO | WO-2013043488 | A1 * | 3/2013 | ........... H04N 5/2254 |
| WO | WO-2019065822 | A1 * | 4/2019 | ........... G02B 13/009 |

* cited by examiner

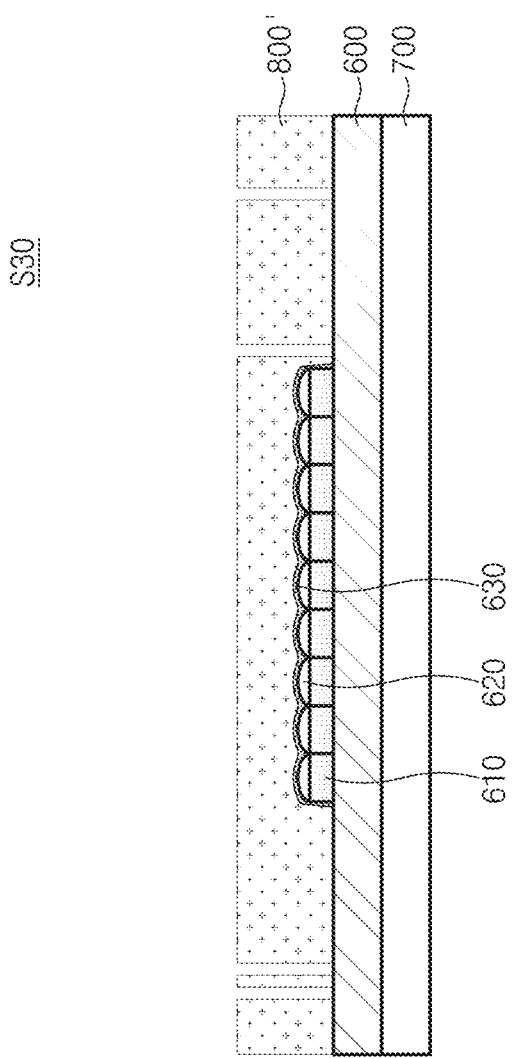

IMAGE SENSING DEVICE FOR ACQUIRING A LIGHT FIELD IMAGE

CROSS-REFERENCE TO RELATED APPLICATION

This patent document claims the priority and benefits of Korean patent application No. 10-2020-0042330, filed on Apr. 7, 2020, the disclosure of which is incorporated herein by reference in its entirety as part of the disclosure of this patent document.

TECHNICAL FIELD

The technology and implementations disclosed in this patent document generally relate to an image sensing device capable of acquiring a light field image, and an image capturing device including the same.

BACKGROUND

An image sensor is a device for capturing optical images by converting light into electrical signals using a semiconductor material that reacts to light. With the recent development of automotive, medical, computer and communication industries, the demand for high-performance image sensors is increasing in various devices such as smartphones, digital cameras, game consoles, Internet of Things (IoT), robots, surveillance cameras, medical micro-cameras, etc.

Image sensors may be broadly classified into a CCD (charge coupled device)-based image sensor and a CMOS (complementary metal oxide semiconductor)-based image sensor. CCD image sensors create high-quality, low-noise images, and traditionally have advantages over the CMOS image sensor in terms of noise characteristics. However, CMOS image sensors are now widely used due to certain advantages over the CCD counterparts, including, e.g., higher frame rates and shutter speed. In addition, CMOS image sensors and signal processing circuitry can be integrated into a single chip, making it possible to miniaturize electronic devices while achieving lower power consumption. Furthermore, using the CMOS fabrication technology can result in reduction in the production costs. Such characteristics of CMOS image sensors make these sensors better suited for implementations in mobile devices.

SUMMARY

Various embodiments of the disclosed technology relate to an image sensor capable of simultaneously acquiring a light field image and a normal image, and an image capturing device including the same.

In an embodiment of the disclosed technology, an image sensing device may include a pixel array configured to include a first pixel group and a second pixel group that are contiguous to each other, each of the first pixel group and second pixel group including a plurality of imaging pixels to convert light into pixel signals, and a light field lens array disposed over the pixel array to direct light to the imaging pixels and configured as a moveable structure that is operable to move between a first position and a second position in a horizontal direction by a predetermined distance corresponding to a width of the first pixel group or a width of the second pixel group, the light field lens array configured to include one or more lens regions each including a light field lens and one or more open regions formed without the light field lens to enable both light filed imaging and conventional imaging.

In another embodiment of the disclosed technology, an image sensing device may include a pixel array including a plurality of pixels, and a light field lens array disposed over the pixel array and configured to move between a first position and a second position in a horizontal direction by a predetermined distance, the light field lens array configured to include one or more lens regions each including a light field lens and one or more open regions formed without the light field lens. At least one of the plurality of pixels is configured to receive light through the one or more lens regions upon placing the light field lens array at the first position, and receive light through the one or more open regions upon placing the light field lens array at the second position.

In another embodiment of the disclosed technology, an image sensing device may include a pixel array configured to include a first pixel group and a second pixel group that are contiguous to each other, and a light field lens array disposed over the pixel array, configured to move to a first position or to move from the first position to a second position in a horizontal direction by a predetermined distance corresponding to a width of the first pixel group or a width of the second pixel group, and configured to include a lens region in which a light field lens is disposed and an open region from which the light field lens is omitted.

In another embodiment of the disclosed technology, an image sensing device may include a pixel array including a plurality of pixels, and a light field lens array disposed over the pixel array, configured to move to a first position or to move from the first position to a second position in a horizontal direction by a predetermined distance, and configured to include a lens region in which a light field lens is disposed and an open region from which the light field lens is omitted. Any one of the plurality of pixels may receive light through any one of the lens region and the open region in a situation in which the light field lens array is disposed at the first position, and may receive light through the other one of the lens region and the open region in a situation in which the light field lens array is disposed at the second position.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

FIGS. 8A to 8J are cross-sectional views illustrating examples of methods for forming the image sensor based on some implementations of the disclosed technology.

DETAILED DESCRIPTION

Figure 1:
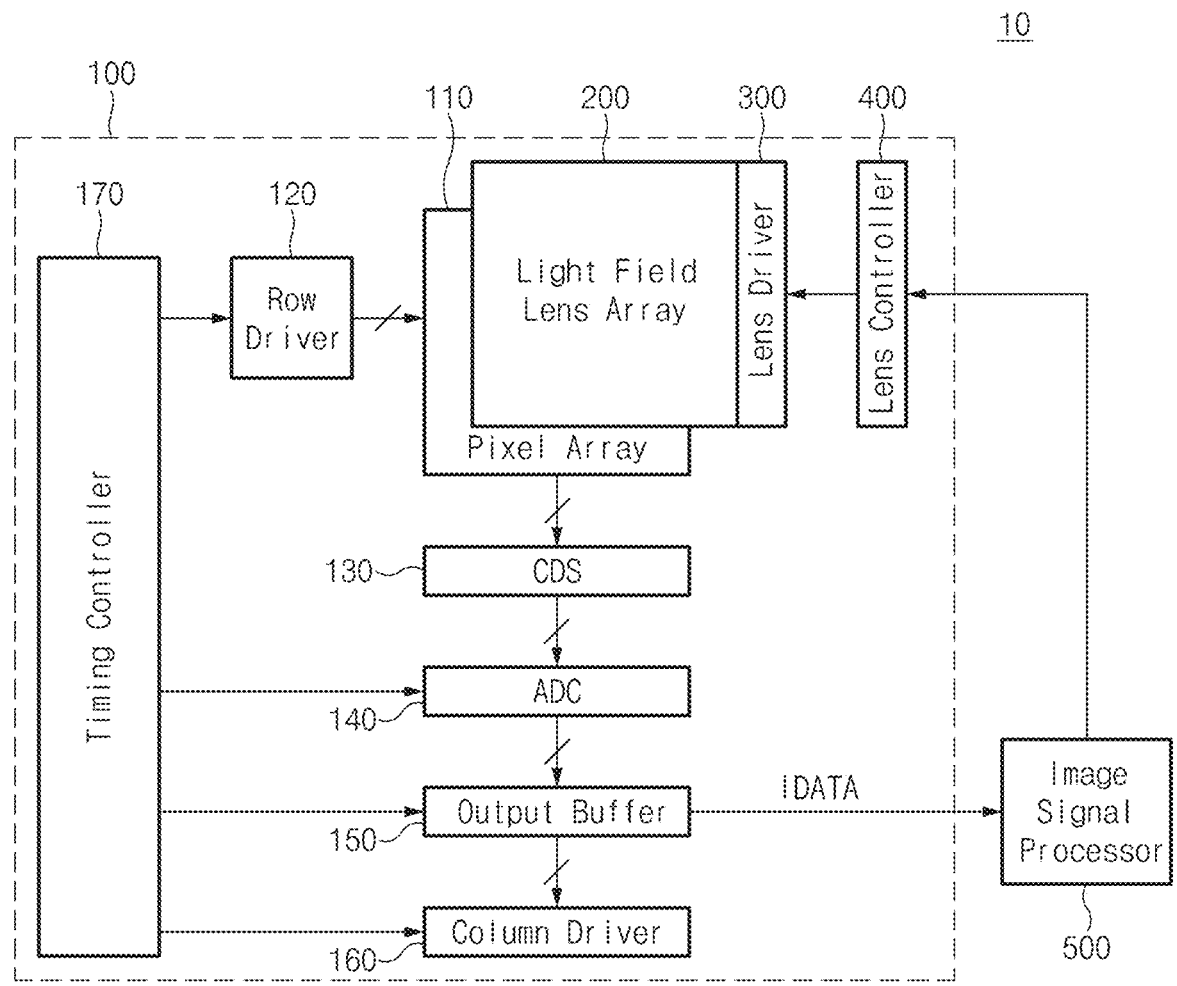
FIG. 1 is a block diagram illustrating an example of an image capturing device based on some implementations of the disclosed technology.

This patent document provides implementations and examples of an image sensing device that substantially addresses one or more issues due to limitations and disadvantages of the related art. Some implementations of the disclosed technology relate to the image sensor for simultaneously acquiring a light field image and a normal image, and an image capturing device including the same. In recognition of the issues above, the disclosed technology provides various implementations of an image sensor which can simultaneously acquire a light field image and a normal image by adding a minimum number of mechanical configurations to a top surface of the image sensor, without adding a thick mechanical configuration to the upper portion of the image sensor.

Reference will now be made in detail to the embodiments of the disclosed technology, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein, but on the contrary, the disclosure is intended to cover all modifications, equivalents, and alternatives falling within the spirit and scope of the embodiments.

FIG. 1 is a block diagram illustrating an example of an image capturing device 10 based on some implementations of the disclosed technology.

Referring to FIG. 1, the image capturing device 10 may be used to take pictures and/or videos. For example, the image capturing device 10 may be implemented as a digital single lens reflex (DSLR) camera, a mirrorless camera, or a mobile phone (e.g., smartphone). Examples of the image capturing device 10 may include a device that includes both a lens and an image pickup element to capture a target object, creating an image using the captured image.

The image capturing device 10 may include an image sensor 100 and an image signal processor 500.

The image sensor 100 may be implemented as a complementary metal oxide semiconductor (CMOS) image sensor (CIS) for converting an optical signal into an electrical signal. The image sensor 100 may use any type of image sensing technology including CCD and CMOS. The image sensor 100 may provide the image signal processor 500 with image data obtained by converting the optical signal into the electrical signal. The image signal processor 500 may operate the image sensor 100 and may adjust setting such as an operation mode and sensitivity of the image sensor 100.

The image sensor 100 may include a pixel array 110, a row driver 120, a correlated double sampler (CDS) 130, an analog-to-digital converter (ADC) 140, an output buffer 150, a column driver 160, a timing controller 170, a light field lens array 200, a lens driver 300, and a lens controller 400.

The pixel array 110 may include a plurality of unit pixels arranged in a two-dimensional (2D) matrix array including a plurality of rows and a plurality of columns. In the plurality of unit pixels, each unit pixel or at least two unit pixels may be arranged to share at least one circuit element of the image sensor, so that the plurality of unit pixels can operate on a shared pixel basis to convert an optical signal or incident light into an electrical signal. Each unit pixel or each shared pixel may correspond to a 3T pixel (3 transistors per pixel), a 4T pixel (4 transistors per pixel), or a 5T pixel (5 transistors per pixel), and may include more than five transistors. The pixel array 110 may receive a drive signal such as a row selection signal, a pixel reset signal, and a transmission (Tx) signal from the row driver 120, and may be operated based on the drive signal received from the row driver 120.

The row driver 120 may activate the pixel array 110 based on control signals of the timing controller 170. In some implementations, the row driver 120 may select at least one row from the pixel array 110. The row driver 120 may generate a row selection signal to select at least one of a plurality of rows. The row driver 120 may sequentially enable a pixel reset signal for resetting pixels corresponding to at least one selected row, and a transmission (Tx) signal for the selected pixels to transmit electrical signals generated by the pixels. As a result, an analog-type reference signal and an image signal that are generated from each pixel of the selected row may be sequentially transmitted to the CDS 130. In the context of this patent document, the term "pixel signal" can be used to indicate the reference signal and the image signal. The reference signal may be used to remove an offset (e.g., reset noise, etc.) from the image signal.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after a light signal is incident on the pixels so that only pixel output voltages based on the incident light can be measured. In some embodiments of the disclosed technology, the CDS 130 may sequentially sample and hold the reference signal and the image signal that are transferred from the pixel array 110 to each of the plurality of column lines. That is, the CDS 130 may sample and hold voltage levels of the reference signal and the image signal corresponding to each column of the pixel array 110.

The CDS 130 may transmit a correlated double sampling (CDS) signal corresponding to the reference signal and the image signal for each column to the ADC 140 upon receiving a control signal from the timing controller 170.

The ADC 140 is used to convert analog CDS signals to digital signals. Examples of the ADC 140 may be implemented as a ramp-compare type ADC. The ramp-compare type ADC may include a comparator that compares the analog pixel signal with a reference signal such as a ramp signal that ramps up or down and a counter that counts until a voltage of the ramp signal matches the analog pixel signal. In some embodiments of the disclosed technology, the ADC 140 may receive the CDS signal for each column from the CDS circuit 130, may convert the received CDS signal into a digital signal, and may thus output the digital signal. In some implementations, the ADC 140 samples an input signal (e.g., pixel signal) multiple times using the reference signal and analog-to-digital convert the sampled input signals by counting the number of clock pulses until crossing points. The ADC 140 may perform counting and calculation operations based on the CDS signal for each column and a ramp signal received from the timing controller 170, such that the ADC 140 may generate digital image data from which noise (e.g., unique reset noise for each pixel) corresponding to each column is removed.

The ADC 140 may include a plurality of column counters corresponding to respective columns of the pixel array 110, and may convert the CDS signal for each column into a digital signal using the column counters, resulting in formation of image data. In another embodiment, the ADC 140 may include a single global counter, and may convert a CDS signal corresponding to each column into a digital signal using a global code received from the global counter.

The output buffer 150 may receive image data for each column transmitted from the ADC 140. In addition, the output buffer 150 may capture the received image data, and may output the captured image data. The output buffer 150 may temporarily store image data that is output from the ADC 140 upon receiving a control signal from the timing controller 170. The output buffer 150 may operate as an interface configured to compensate for data rate difference or transmission (Tx) speed difference between the image sensor 100 and another device coupled to the image sensor 100.

The column driver 160 may select a column of the output buffer 150 upon receiving a control signal from the timing controller 170, and may sequentially output the image data temporarily stored in the selected column of the output buffer 150. In some implementations, the column driver 160 may receive an address signal from the timing controller 170, may generate a column selection signal based on the received address signal, and may select a column of the output buffer 150 to control image data to be output as an output signal IDATA from the selected column of the output buffer 150.

The timing controller 170 may control the row driver 120, the ADC 140, the output buffer 150, and the column driver 160.

The timing controller 170 may transmit a clock signal for operating or synchronizing the constituent elements of the image sensor 100, a control signal needed for timing control, and address signals needed for selection of a row or column to the row driver 120, the column driver 160, the ADC 140, and the output buffer 150. In some implementations, the timing controller 170 may include a logic control circuit, a phase locked loop (PLL) circuit, a timing control circuit, a communication interface circuit, etc.

Light field image sensors captures information about the light field from a scene, including the intensity of light entering the image sensors and the direction that the light rays are traveling. One type of light field image sensor uses an array of lenses placed in front of an image sensor to sense intensity, color, and directional information. In some implementations, image sensors are positioned slightly behind the lenses, and images that are not in focus can be analyzed and depth information can be extracted via digital signal processing based on the captured light field data.

In some implementations, the light field lens array 200 may include a plurality of light field lenses structured to acquire light field images. A light field image may be used for a light field image acquisition scheme that first acquires images of a plurality of viewpoints using the plurality of light field lenses, and then analyzes images of the respective viewpoints, followed by a digital signal processing process to construct a desired final image including the extracted depth information using the analyzed images. For example, the plurality of light field lenses in the light field lens array 200 may have different viewpoints depending on relative positions of the light field lenses in the light field lens array 200, such that a plurality of images acquired from incident light having penetrated the respective light field lenses may be used to extract depth information. Accordingly, the image signal processor 500 may analyze the plurality of images to accurately estimate a relative distance to each object included in the image taken by the image sensor with light field lenses. Depth information acquired from the light field image may be used in refocusing, stereoscopic image acquisition, etc.

The light field lens array 200 may be disposed between an objective lens (not shown) and the pixel array 110. The objective lens may condense incident light received from a target object. By way of example, the light field lens array 200 may be disposed at a focal length of the objective lens (not shown).

The light field lens array 200 may be formed to have a plurality of openings or gaps such that a plurality of light field lens portions are periodically arranged with openings or gaps therebetween. As a result, some of the light rays entering the image sensor pass through the light field lenses and the other of the light rays reach the image sensor without passing through the light field lenses by passing through the openings or gaps such that incident light received via the opening regions without the light field lens regions are captured by the exposed unit pixels like a conventional digital camera to produce pixel outputs representing a 2-dimensional image of the target object to be imaged.

In addition, the light field lens array 200 may horizontally move from a first position to a second position by a predetermined distance. In this case, the predetermined distance may be substantially identical to a width of the single light field lens (or each of the lens region and the open region).

Each pixel configured to detect incident light through the lens region of the light field lens array 200 disposed at the first position may acquire a light field image. Each pixel configured to detect incident light through the open region of the light field lens array 200 disposed at the first position may acquire a normal image. In this case, the normal image may refer to a color image obtained by sensing incident light passing through the openings, not the light field lens.

Each pixel configured to detect incident light through the lens region of the light field lens array 200 disposed at the second position may acquire a light field image. Each pixel configured to detect incident light through the open region of the light field lens array 200 disposed at the second position may acquire a normal image.

Each pixel contained in the pixel array 110 may create any one of the light field image and the normal image by detecting incident light through the light field lens array 200 disposed at the first position, and may create the other one of the light field image and the normal image by detecting incident light through the light field lens array 200 disposed at the second position. In other words, each pixel of the pixel array 110 may acquire both the light field image and the normal image by capturing the incident light two times.

The lens driver 300 may move the light field lens array 200 to the first position or the second position under control of the lens controller 400. In some implementations, the lens driver 300 can move the light field lens array 200 using electrostatic force.

The lens controller 400 may provide the lens driver 300 with a voltage to move the light field lens array 200 from one place to another place under control of the image signal processor 500. In some implementations, if the creation of image data is completed (e.g., when image data corresponding to one frame is created) in a situation where the light field lens array 200 is disposed at the first position, the lens controller 400 may control the lens driver 300 to move the light field lens array 200 to the second position. Thereafter, if the creation of image data is completed in a situation where the light field lens array 200 is disposed at the second position, the lens controller 400 may control the lens driver 300 such that the light field lens array 200 can move back to the first position. That is, the position of the light field lens array 200 may be alternately shifted from the second position to the first position or from the first position to the second position. In this case, when the light field lens array 200 moves from the first position to the second position or moves from the second position to the first position, the light field lens array 200 may move in a horizontal direction by a predetermined distance. In some implementations, the predetermined distance may be substantially identical to the width of the lens region or the width of the open region. In addition, the predetermined distance may be substantially identical to a width of a first pixel group or a width of a second pixel group as will be discussed below.

The image signal processor 500 may process image data received from the image sensor 100, and may control the image sensor 100. The image signal processor 500 may reduce noise of image data, and may perform various kinds of image signal processing (e.g., gamma correction, color filter array interpolation, color matrix, color correction, color enhancement, etc.) for image-quality improvement of the image data. In addition, the image signal processor 500 may compress image data that has been created by an image signal processing for image-quality improvement, such that the image signal processor 500 can create an image file using the compressed image data. Alternatively, the image signal processor may recover image data from the image file. In this case, the scheme for compressing such image data may be a reversible format or an irreversible format. Examples of such a compression format includes Joint Photographic Experts Group (JPEG) format, JPEG 2000 format. In addition, in terms of video compression, a plurality of frames can be compressed according to Moving Picture Experts Group (MPEG) standards such that video files can be created. For example, the video files may be created according to Exchangeable image file format (Exif) standards.

The image data generated from the image signal processor 500 may be stored in an internal memory or external memory of the image capturing device 10 either in response to a user request or autonomously, such that the stored image data can be displayed through a display.

In addition, the image signal processor 500 may process image data and such an image processing may be associated with, for example, image unclearness, blur processing, edge emphasis, image analysis, image recognition, and image effect.

In addition, the image signal processor 500 may perform display image signal processing for the display. For example, the image signal processor 500 may perform brightness level adjustment, color correction, contrast adjustment, outline emphasis adjustment, screen division processing, character image generation, and image synthesis processing.

In some implementations, the image signal processor 500 may synthesize image data (hereinafter referred to as "first frame") created in a situation where the light field lens array 200 is disposed at the first position and image data (hereinafter referred to as "second frame") created in a situation where the light field lens array 200 is disposed at the second position, thereby creating a light field image corresponding to one frame and a normal image corresponding to one frame. In this case, the above-mentioned synthesizing process may include separating a light field image and a normal image included in the first frame from each other, separating a light field image and a normal image included in the second frame from each other, creating a light field image corresponding to one frame by summing the light field image of the first frame and the light field image of the second frame, and creating a normal image corresponding to one frame by summing a normal image of the first frame and a normal image of the second frame.

In addition, the image signal processor 500 may determine whether the reception of the first frame has been completed. If the reception of the first frame is completed, the image signal processor 500 may control the lens controller 400 to shift the light field lens array 200 to the second position. Thereafter, the image signal processor 500 may determine whether the reception of the second frame has been completed. If the reception of the second frame is completed, the image signal processor 500 may control the lens controller 400 to shift the light field lens array 200 back to the first position.

The image sensor 100 and the image signal processor 500 may be implemented as different chips, or may be integrated into a single chip.

Figure 2:
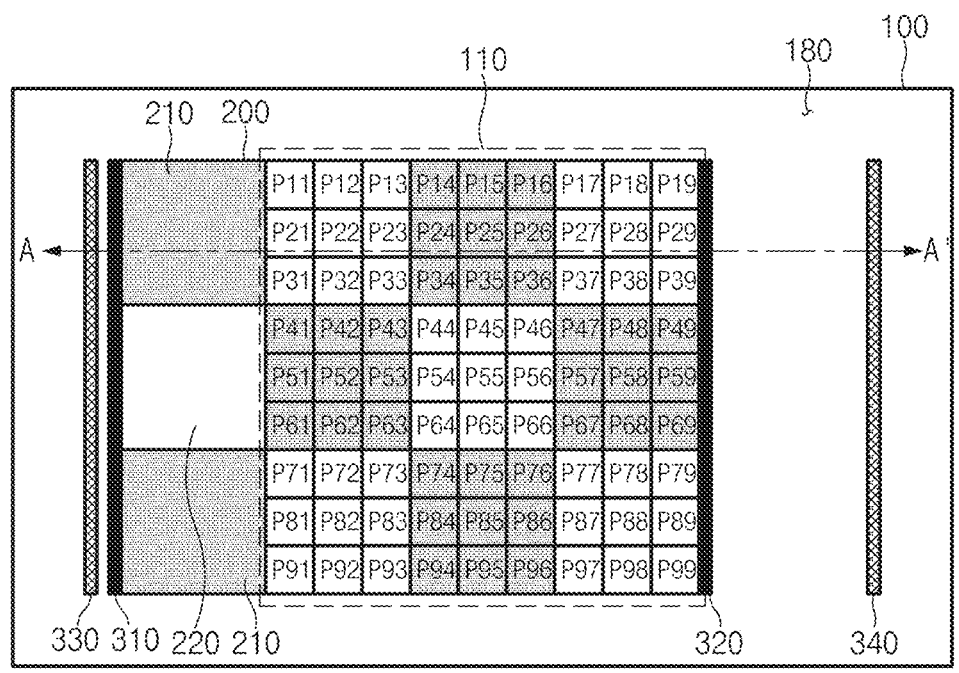
FIG. 2 is a schematic diagram illustrating an example of an image sensor in a situation in which a light field lens array is disposed at a first position based on some implementations of the disclosed technology.
Figure 3:
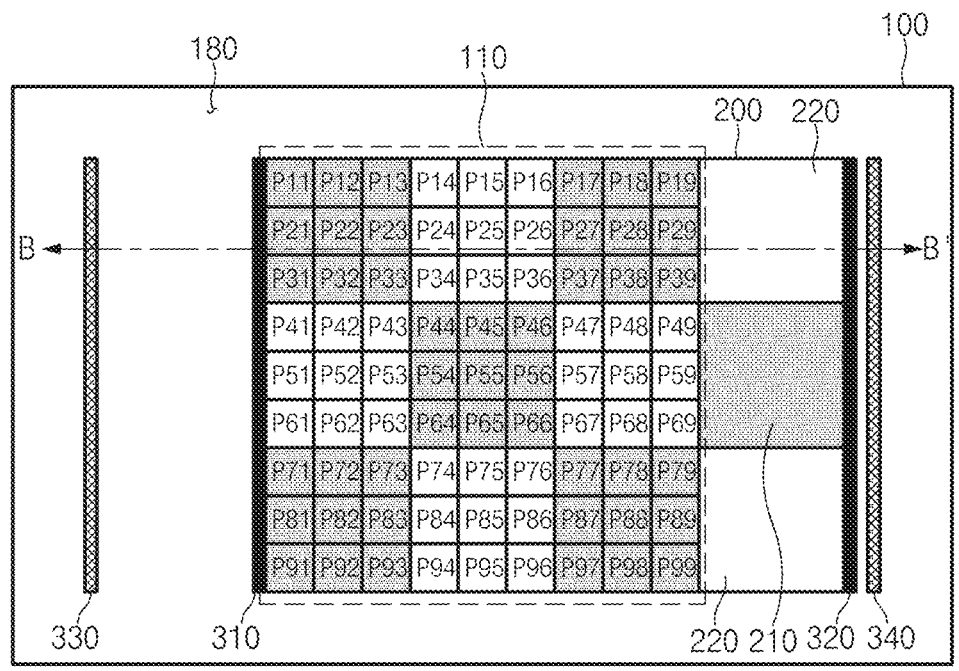
FIG. 3 is a schematic diagram illustrating an example of an image sensor in a situation in which a light field lens array is disposed at a second position based on some implementations of the disclosed technology.

FIG. 2 is a schematic diagram illustrating an example of the image sensor in a situation in which the light field lens array is disposed at the first position based on some implementations of the disclosed technology. FIG. 3 is a schematic diagram illustrating an example of the image sensor in a situation in which the light field lens array is disposed at the second position based on some implementations of the disclosed technology.

Referring to FIGS. 2 and 3, a plan view of the image sensor 100 in a situation where the light field lens array 200 is disposed at the first position is illustrated, and a plan view of the image sensor 100 in a situation where the light field lens array 200 is disposed at the second position is illustrated.

The plan view of the image sensor 100 may include the pixel array 110, the light field lens array 200, and a peripheral region 180 surrounding the pixel array 110.

The pixel array 110 may include a plurality of pixels arranged in a matrix array including a plurality of rows and a plurality of columns. Each pixel may be defined by 'Pnm' (where each of 'n' and 'm' is an integer of 1 or more). Here, 'n' is a number allocated to a row to which the corresponding pixel belongs, and 'm' is a number allocated to a column to which the corresponding pixel belongs. For example, 'P46' may refer to a pixel belonging to the fourth row and the sixth column. In some implementations, it is assumed that the pixel array 110 includes 81 pixels arranged in a (9×9) matrix including 9 rows and 9 columns for convenience of description and better understanding of the disclosed technology. In some other implementations, the pixel array 110 may include a plurality of pixels arranged in a matrix including an arbitrary number of rows and an arbitrary number of columns.

The light field lens array 200 may include a plurality of lens regions 210 and a plurality of open regions 220 such that the light field lenses are periodically arranged in the lens regions 210 with open regions 220 therebetween. Although FIG. 2 illustrates the lens region 210 and the open region 220 as being arranged in a block-check pattern (or in a zigzag pattern), the lens region 210 and the open region 220 can also be arranged in a different pattern. For example, the lens region 210 and the open region 220 may be alternately arranged in a first direction (i.e., in a row direction or in a horizontal direction) or in a second direction (i.e. in a column direction or in a vertical direction) perpendicular to the first direction. In addition, the lens region 210 or the open region 220 may be linearly arranged in a diagonal direction to the first or second direction.

Each of the lens region 210 and the open region 220 may have substantially the same area as 9 pixels arranged in a (3×3) matrix. The number of pixels corresponding to each of the lens region 210 and the open region 220 in the drawings is illustrated by way of example only. For example, pixels corresponding to each of the lens region 210 and the open region 220 may be 100 pixels arranged in a (10×10) matrix.

In some implementations, the light field lens array 200 may have a larger area than the pixel array 110. In some implementations, the light field lens array 200 may be larger in width than the pixel array 110 by a predetermined length corresponding to either the width of the lens region 210 or the width of the open region 220. Therefore, the light field lens array 200 may include the lens region 210 and the open region 220 that do not overlap the pixel array 110 and are arranged in the second direction as shown in FIG. 2. As a result, the light field lens array 200 can move to the first or second position, and the light field lens array 200 can cover the entire region of the pixel array 110 at the first or second position.

Although FIG. 2 illustrates a first moving electrode 310, a second moving electrode 320, a first fixed electrode 330, and a second fixed electrode 340 constituting the lens driver 300 as being disposed in the peripheral region 180, it should be noted that various kinds of constituent elements other than the pixel array can be disposed in the peripheral region 180.

The first moving electrode 310 and the second moving electrode 320 may be connected to the light field lens array 200 to move the light field lens array 200 in a horizontal direction. The first moving electrode 310 and the second moving electrode 320 may receive voltages having the same polarity (e.g., a negative polarity). The first moving electrode 310 and the second moving electrode 320 may be combined with mechanical elements to shift between the first position and the second position. For example, the mechanical elements may be configured to reduce frictional force between the first moving electrode 310 and a substrate and/or frictional force between the second moving electrode 320 and the substrate. The mechanical elements may facilitate the movement of the first moving electrode 310 and the second moving electrode 320. For example, the mechanical elements may include microelectromechanical systems (MEMS) installed on the substrate.

The first moving electrode 310 may extend along a first side (e.g., a left side in the example of FIG. 3) of the light field lens array 200, and a top surface of the first moving electrode 310 may be attached to a bottom surface of the light field lens array 200.

The second moving electrode 320 may extend along a second side (e.g., a right side in the example of FIG. 3) facing away from the first side of the light field lens array 200, and a top surface of the second moving electrode 320 may be attached to a bottom surface of the light field lens array 200.

The first fixed electrode 330 and the second fixed electrode 340 may be respectively disposed at predetermined positions, thereby providing electrostatic force capable of moving the light field lens array 200. In this case, the predetermined positions may be determined based on the first position and the second position. The first fixed electrode 330 and the second fixed electrode 340 may receive voltages having different polarities (e.g., negative (−) and positive (+) polarities).

When the first fixed electrode 330 receives another voltage that is different in polarity from the first moving electrode 310, the first moving electrode 310 moves toward the first fixed electrode 330 by attractive force between the first fixed electrode 330 and the first moving electrode 310, and the second moving electrode 320 moves toward the first fixed electrode 330 by repulsive force between the second fixed electrode 340 and the second moving electrode 320, placing the light field lens array 200 at the first position as shown in FIG. 2.

When the first fixed electrode 330 receives a voltage having the same polarity as the first moving electrode 310, the first moving electrode 310 moves toward the second fixed electrode 340 by repulsive force between the first fixed electrode 330 and the first moving electrode 310, and the second moving electrode 320 moves toward the second fixed electrode 340 by attractive force between the second fixed electrode 340 and the second moving electrode 320, placing the light field lens array 200 at the second position as shown in FIG. 3.

In this case, the magnitude of voltages applied to the respective electrodes 310-340 may be experimentally determined based on the moving speed of the light field lens array 200, durability of the mechanical elements, power consumption, etc. Each of the electrodes 310-340 may include a metal material that has electrostatic force in response to a reception voltage. For example, each of the electrodes 310-340 may include iron (Fe), copper (Cu), or a metal alloy.

As discussed above, the light field lens array 200 may be implemented to horizontally move in the first direction, but the light field lens array 200 can also be implemented to move horizontally in the second direction. In this case, the first moving electrode 310, the second moving electrode 320, the first fixed electrode 330, and the second fixed electrode 340 may be arranged at upper and lower sides of the pixel array 110, instead of being arranged at left and right sides of the pixel array 110.

Figure 4:
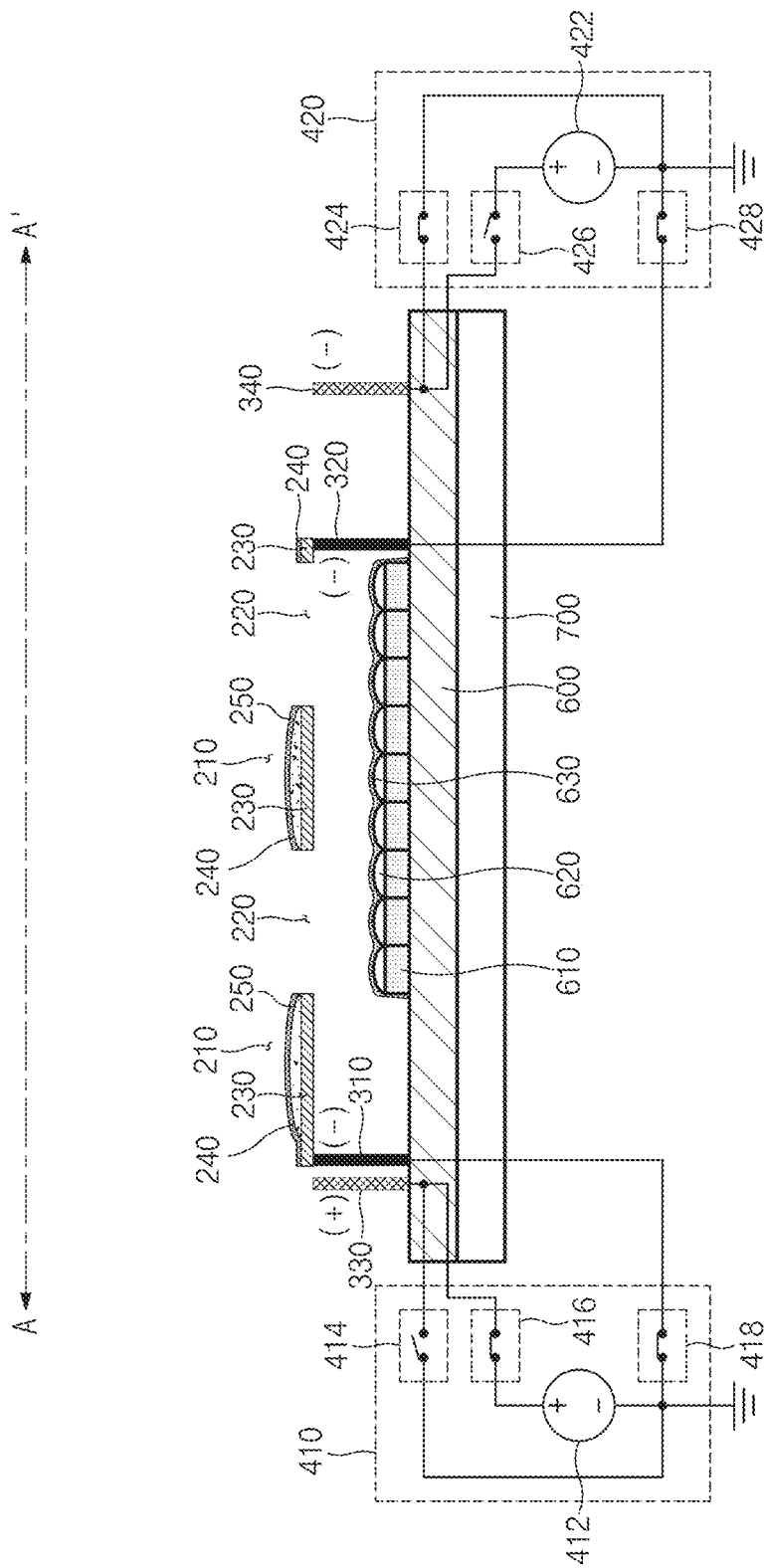
FIG. 4 is a cross-sectional view illustrating an example of the image sensor shown in FIG. 2 based on some implementations of the disclosed technology.
Figure 5:
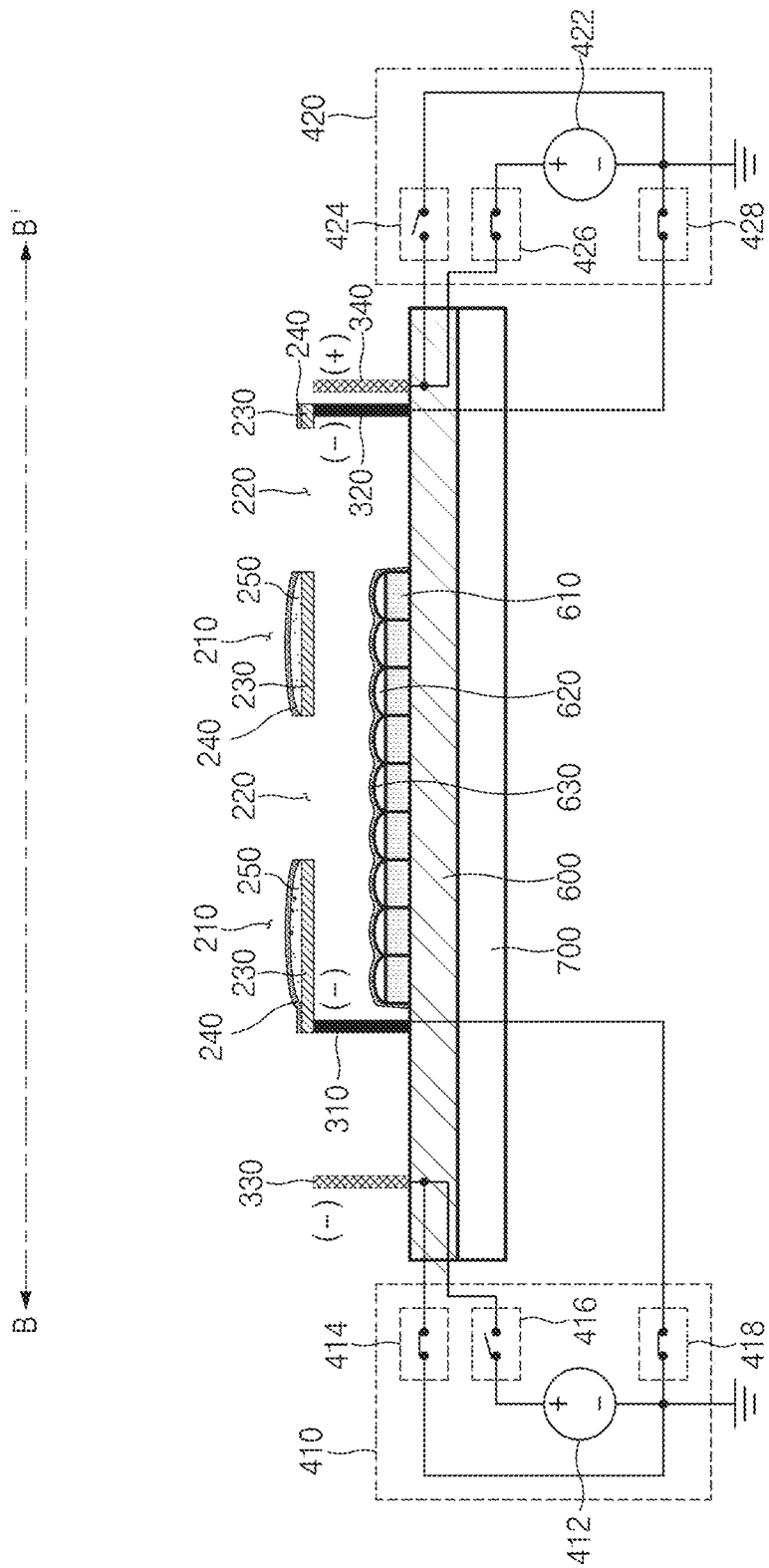
FIG. 5 is a cross-sectional view illustrating an example of the image sensor shown in FIG. 3 based on some implementations of the disclosed technology.

FIG. 4 is a cross-sectional view illustrating an example of the image sensor 100 shown in FIG. 2 based on some implementations of the disclosed technology. FIG. 5 is a cross-sectional view illustrating an example of the image sensor 100 shown in FIG. 3 based on some implementations of the disclosed technology.

In more detail, FIG. 4 is a cross-sectional view illustrating an example of the image sensor 100 taken along the line A-A' shown in FIG. 2, and FIG. 5 is a cross-sectional view illustrating an example of the image sensor 100 taken along the line B-B' shown in FIG. 3.

The image sensor 100 may include a substrate 600, an optical filter 610, an on-chip lens 620, and a wiring layer (also called a line layer) 700.

The substrate 600 may include a top surface and a bottom surface facing away from each other. In the context of this patent document, the term "front side" can be used to indicate the top surface of the substrate 600 and the term "back side" can be used to indicate the bottom surface of the substrate 600. In one example, the substrate 600 may be a P-type or N-type bulk substrate. In another example, the substrate 600 may be a P-type bulk substrate including a P-type or N-type epitaxial layer grown therein. In another example, the substrate 600 may be an N-type bulk substrate including a P-type or N-type epitaxial layer grown therein. In one implementation of the disclosed technology, the image sensor 100 includes a back side illumination (BSI) structure that receives incident light through a back side of the substrate 600. In another implementation of the disclosed technology, the image sensor 100 may include a front side illumination (FSI) structure structured to receive incident light through a front side of the substrate 600.

The substrate 600 may include a plurality of photoelectric conversion elements, each of which corresponds to each pixel. Each of the photoelectric conversion elements may generate and accumulate photocharges corresponding to the amount (or intensity) of incident light rays in an inner region thereof. As an example, each photoelectric conversion element may be formed as an N-type doped region through ion implantation of N-type ions. In some implementations, the photoelectric conversion element may be formed by stacking a plurality of doped regions. In this case, a lower doped region may be formed by implantation of $N^+$ ions, and an upper doped region may be formed by implantation of $N^-$ ions. The photoelectric conversion element may be arranged across as large a region as possible to increase a fill factor indicating light reception (Rx) efficiency. In some implementations, a device isolation layer disposed between the photoelectric conversion elements of the contiguous pixels may be formed to be deeply etched in a vertical direction, so that the device isolation layer can electrically or optically isolate each of the contiguous pixels located adjacent to each other.

The optical filter 610 may be formed over the substrate 600 to selectively transmit light at a specific wavelength (e.g., light at a "red" wavelength, light at a "green" wavelength, light at a "blue" wavelength, light at a "magenta" wavelength, light at a "yellow" wavelength, light at a "cyan" wavelength, infrared (IR) light).

The on-chip lens 620 may be formed over the optical filter 610, and may increase light gathering power of incident light, improving light reception (Rx) efficiency of the photoelectric conversion element. The on-chip lens 620 may include transparent inorganic materials.

The optical filter 610 and the on-chip lens 620 may be arranged independently such that each pixel is mapped to an optical filter 610 and an on-chip lens 620. For example, the optical filter 610 and the on-chip lens 620 may be mapped to a pixel P24 illustrated in FIG. 3.

An on-chip lens protection layer 630 may be formed over the on-chip lens 620 to protect the on-chip lens 620 from potential physical or chemical damages. For example, the on-chip lens protection layer 630 may include at least one of polyimide, a transparent organic material, and a transparent inorganic material.

The wiring layer (also called a line layer) 700 may include a signal line for providing a control signal for activating each pixel and signal line for transferring a pixel signal generated from each pixel. Transistors contained in each pixel may be disposed below the substrate 600 and over the wiring layer 700, and may be coupled to the signal line of the wiring layer 700. For example, the wiring layer 700 may include a stacked structure including a metal layer and an insulation layer formed in a pattern shape and alternately stacked.

In some implementations of the disclosed technology, the light field lens array 200 may include the lens region 210 and the open region 220. The open region 220 does not include the lens and may be arranged among a plurality of the lens regions 210 to allow incident light to propagate toward the pixel array 110 without passing through the lens region 210.

The lens region 210 may include a support plate 230, a light field lens 240, and a light field lens protection layer 250 that are sequentially stacked.

The support plate 230 may be formed in an integrated shape within the light field lens array 200, and may support the light field lens array 200 and the light field lens protection layer 250 maintain the shape of the light field lens array 200. FIG. 2 and FIG. 3 illustrate the lens regions 210 as contiguous regions, the support plate 230 located at a connection portion between the contiguous lens regions 210 may be formed to have a predetermined width such that adjacent lens regions 210 are spaced apart from each other by the predetermined width.

The support plate 230 may include transparent conductive materials having a predetermined strength. For example, the support plate 230 may include at least one of Indium Tin Oxide (ITO), Indium Zinc Oxide (IZO), Zinc Oxide (ZnO), and other transparent conductive materials. The support plate 230 may be elongated to the outside of the lens region 210 and the open region 220 by a predetermined length, connecting to the first moving electrode 310 and the second moving electrode 320.

The light field lens 240 may include a transparent organic material having a predetermined curvature. The curvature of the light field lens 240 and the distance between the light field lens 240 and the on-chip lens protection layer 630 may be determined so that light can pass through the light field lens 240 and reach the corresponding lens region 210. In some implementations, only one lens region 210 may include only one light field lens 240. In addition, the single light field lens 240 may correspond to a plurality of pixels contained in a first or second pixel group formed to overlap with the single lens region 210.

The light field lens protection layer 250 may be formed over the light field lens 240 to protect the light field lens 240 from potential physical or chemical damages. For example, the light field lens protection layer 250 may include at least one of polyimide, a transparent organic material, and a transparent inorganic material.

Each of the first moving electrode 310 and the second moving electrode 320 may include a conductive material having a predetermined thickness enough to support the light field lens array 200. The first moving electrode 310 may be identical in height to the second moving electrode 320. The light field lens 240 and the on-chip lens protection layer 630 may be spaced apart from each other by a predetermined distance.

The first fixed electrode 330 may be formed in shape and material corresponding to the first moving electrode 310, and the second fixed electrode 340 may be formed in shape and material corresponding to the second moving electrode 320.

As described above, the lens driver 300 shown in FIG. 1 may include the first moving electrode 310, the second moving electrode 320, the first fixed electrode 330, and the second fixed electrode 340. The lens controller 400 shown in FIG. 1 may include a first controller 410 and a second controller 420.

The first controller 410 may provide a voltage to the first moving electrode 310 and the first fixed electrode 330. The first controller 410 may include a first voltage source 412, a first switch 414, a second switch 416, and a third switch 418.

The first voltage source 412 may provide a voltage for shifting the light field lens array 200 to the first or second position. The first voltage source 412 may include a first terminal coupled to a ground voltage, and a second terminal to output a high voltage higher than the ground voltage by a predetermined value.

The first switch 414 may be coupled between the first terminal and the first fixed electrode 330, the second switch 416 may be coupled between the second terminal and the first fixed electrode 330, and the third switch 418 may be coupled between the first terminal and the first moving electrode 310. Each of the first switch 414, the second switch 416, and the third switch 418 may be opened or short-circuited upon receiving a control signal from the image signal processor 500.

The second controller 420 may provide a voltage to the second moving electrode 320 and the second fixed electrode 340. The second controller 420 may include a second voltage source 422, a fourth switch 424, a fifth switch 426, and a sixth switch 428.

The second voltage source 422 may provide a voltage for shifting the light field lens array 200 to the first or second position. The second voltage source 422 may include a third terminal coupled to a ground voltage, and a fourth terminal to output a high voltage higher than the ground voltage by a predetermined value. In this case, the voltage received from the second voltage source 422 may be substantially identical to the voltage received from the first voltage source 412. In some other implementations, a negative (−) voltage having a predetermined magnitude, instead of the ground voltage, may be applied to the first or third terminal.

In the context of this patent document, the term "first voltage" may be used to indicate a voltage that is applied from the first or third terminal, and the term "second voltage" may be used to indicate a voltage that is applied from the second or fourth terminal.

The fourth switch 424 may be coupled between the third terminal and the second fixed electrode 340, the fifth switch 426 may be coupled between the fourth terminal and the second fixed electrode 340, and the sixth switch 428 may be coupled between the third terminal and the second moving electrode 320. Each of the fourth switch 424, the fifth switch 426, and the sixth switch 428 may be opened or short-circuited upon receiving a control signal from the image signal processor 500.

In FIG. 4, the first switch 414 and the fifth switch 426 may be opened, and the second, third, fourth, and sixth switches 416, 418, 424, and 428 may be short-circuited. Therefore, the first fixed electrode 330 may receive a second voltage, and each of the first moving electrode 310, the second moving electrode 320, and the second fixed electrode 340 may receive a first voltage. Therefore, attractive electrostatic force may be generated between the first moving electrode 310 and the first fixed electrode 330, repulsive electrostatic force may be generated between the second moving electrode 320 and the second fixed electrode 340, and the light field lens array 200 may move to the first position and may then be fixed thereto as shown in FIG. 4.

In FIG. 5, the second switch 416 and the fourth switch 424 may be opened, and the first, third, fifth, and sixth switches 414, 418, 426, and 428 may be short-circuited. Therefore, the second fixed electrode 340 may receive a second voltage, and each of the first moving electrode 310, the second moving electrode 320, and the first fixed electrode 330 may receive a first voltage. Therefore, repulsive electrostatic force may be generated between the first moving electrode 310 and the first fixed electrode 330, attractive electrostatic force may be generated between the second moving electrode 320 and the second fixed electrode 340, and the light field lens array 200 may move to the second position and may then be fixed thereto as shown in FIG. 5.

In some implementations, the first controller 410 and the second controller 420 may further include additional circuitry to provide a suitable voltage to the respective fixed and moving electrodes. In an implementation, the first controller 410 and the second controller 420 can be arranged in the substrate 600 and the wiring layer 700. In another implementation, the first controller 410 and the second controller 420 may be arranged in a chip that includes separate logic circuits.

In one example, each of the first to sixth switches 414, 416, 418, 424, 426, and 428 can be implemented as a transistor provided with a gate that receives a control signal from the image signal processor 500.

Figure 6:
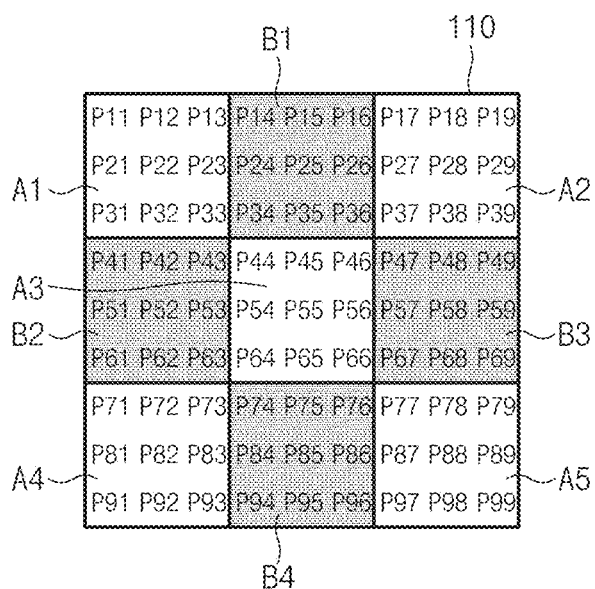
FIG. 6 is a schematic diagram illustrating an example of an image created from a pixel array shown in FIG. 2 based on some implementations of the disclosed technology.
Figure 7:
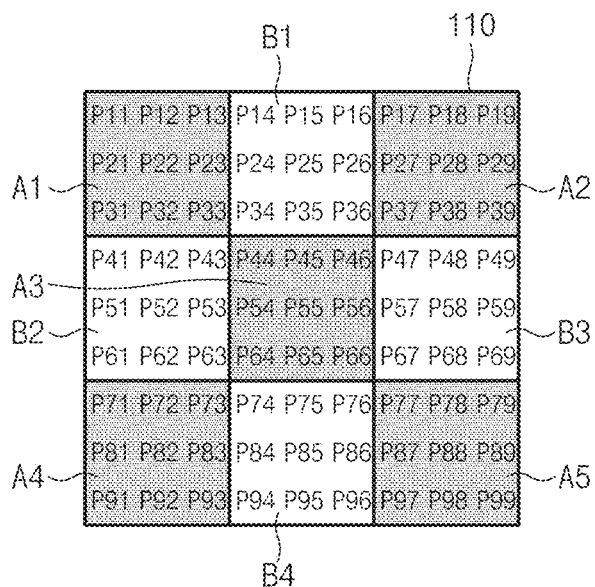
FIG. 7 is a schematic diagram illustrating an example of an image created from a pixel array shown in FIG. 3 based on some implementations of the disclosed technology.

FIG. 6 is a schematic diagram illustrating an example of an image created from the pixel array in the situation shown in FIG. 2 based on some implementations of the disclosed technology. FIG. 7 is a schematic diagram illustrating an example of an image created from the pixel array in the situation shown in FIG. 3 based on some implementations of the disclosed technology.

Referring to FIGS. 6 and 7, pixels arranged in a (9×9) matrix may be classified into first pixel groups A1-A5 and second pixel groups B1-B4.

Each of the first pixel groups A1-A5 may include pixels arranged in a (3×3) matrix. Each of the second pixel groups B1-B4 may include pixels arranged in a (3×3) matrix array. Each of the pixel groups A1-A5 or each of the pixel groups B1-B4 may have substantially the same area as the lens region 210 or the open region 220 of the light field lens array 200. In the pixel array 110, the first pixel groups and the second pixel groups may be alternately arranged in the first or second direction.

In FIG. 6, since the light field lens array 200 is disposed at the first position, each of the first pixel groups A1-A5 may overlap with the open region 220, and each of the second pixel groups B1-B4 may overlap with the lens region 210. Therefore, the first pixel groups A1-A5 may create a normal image, and the second pixel groups B1-B4 may create a light field image.

In FIG. 7, since the light field lens array 200 is disposed at the second position, each of the first pixel groups A1-A5 may overlap with the lens region 210, and each of the second pixel groups B1-B4 may overlap with the open region 220. Therefore, the first pixel groups A1-A5 may create a light field image, and the second pixel groups B1-B4 may create a normal image.

In some implementations of the disclosed technology, all pixels contained in the pixel array may create an image once in a situation in which the light field lens array 200 is disposed at the first position and once in a situation in which the light field lens array 200 is disposed at the second position. Therefore, each pixel may be used to create both the light field image and the normal image.

In some implementations, the first position may refer to a specific position where the open region 220 overlaps with an upper portion of each of the first pixel groups A1-A5 and the lens region 210 overlaps with an upper portion of each of the second pixel groups B1-B4. The second position may refer to a specific position where the lens region 210 overlaps with an upper portion of each of the first pixel groups A1-A5 and the open region 220 overlaps with an upper portion of each of the second pixel groups B1-B4.

In some implementations, the first pixel group A1 coincides with the open region 220 at the first position, and the first pixel group A1 coincides with the lens region 210 at the second position. With regard to a certain pixel group, any one of the lens region 210 and the open region 220 coincides with the certain pixel group at the first position, and the other one of the lens region 210 and the open region 220 coincides with the certain pixel group at the second position.

In some implementations, the light field image corresponding to at least some pixels from among the light field images created by each of the pixel groups A1-A5 and B1-B4 may not be used to extract depth information by the image signal processor 500 because pixels located outside each of the pixel groups A1-A5 and B1-B4 are outside a light concentration range of the corresponding light field lens, and reception (Rx) light is very weak. As a result, image processing for such pixels may be omitted, thereby reducing power consumption and calculation times.

By way of example, the pixel array 110 is illustrated as being arranged in a (9×9) matrix array, and thus the movement distance of the light field lens array 200 shifting between the first position and the second position may be considered relatively long. However, the pixel array 110 may include a large number of pixels (e.g., millions in some cases) arranged in a large matrix array including thousands of rows and columns. Each of the lens region 210 and the open region 220 may correspond to a pixel group including 100 pixels arranged in a (10×10) matrix array. In this case, assuming that each pixel has the width of fpm, the movement distance of the light field lens array 200 shifting between the first position and the second position would be only 10 μm.

In one example, the light field lens array 200 located at the first position does not include a column composed of the lens region 210 and the open region 220 in the right side of a portion overlapping the pixel array 110. In another example, the light field lens array 200 may further include at least one column composed of the lens region 210 and the open region 220. In one example, the light field lens array 200 located at the second position does not include a column composed of the lens region 210 and the open region 220 at the left side of a portion overlapping the pixel array 110. In another example, the light field lens array 200 may further include at least one column composed of the lens region 210 and the open region 220.

In some implementations, the sum of the ratio (i.e., a first ratio, for example, 4/9 in the example of FIG. 6) of the number of pixels creating the light field image at the first position of the light field lens array 200 to a total number of pixels and the ratio (i.e., a second ratio, for example, 5/9 in the example of FIG. 7) of the number of pixels creating the light field image at the second position of the light field lens array 200 to a total number of pixels may be set to 1. In other words, the sum of a first region, in which the lens regions 210 of the light field lens array 200 overlap with the pixel array 110 in the situation in which the light field lens array 200 is disposed at the first position, and a second region, in which the lens regions 210 of the light field lens array 200 overlap with the pixel array 110 in the situation in which the light field lens array 200 is disposed at the second position, may be substantially the same area as that of the pixel array 110. If even number of pixel groups are in the pixel array 110, each of the first ratio and the second ratio may be set to 0.5. That is, the lens regions of the light field lens array 200 may overlap with a half of the pixel array 110 at the first position, and may overlap with the remaining half of the pixel array 110 at the second position.

In some implementations, each of the lens region 210, the open region 220, the first pixel group, and the second pixel group may be formed in a square shape. In other implementations, each of the lens region 210, the open region 220, the first pixel group, and the second pixel group may also be formed in a rectangular shape in which a horizontal length is longer than a vertical length or is shorter than the vertical length.

The image sensor 100 based on some implementations of the disclosed technology may simultaneously acquire the light field image and the normal image by adding a simple mechanical structure to an upper portion of the image sensor, without adding a complicated mechanical structure to the upper portion of the image sensor for light field image acquisition.

In order to acquire the light field image using the light field lens array consisting of light field lenses without openings, the light field lens array should be disposed over the pixel array, and in order to acquire the normal image using such a light field lens array, the light field lens array should be completely removed from the upper portion of the pixel array. By contrast, the image sensor 100 based on some implementations of the disclosed technology can greatly simplify the transition between the light field image mode and the normal image mode by using the disclosed light field lens array including the light field lenses with openings therebetween. Furthermore, when acquiring the normal image using the light field lens array consisting of light field lenses without openings, the pixel array and the light field lens array should be in contact with each other, and the light field lens array may unwillingly focus light into an undesired location, thereby deteriorating the light reception of desired locations. In contrast, the image sensor 100 based on some implementations of the disclosed technology can prevent such a deterioration of light reception.

FIGS. 8A to 8J are cross-sectional views illustrating examples of methods for forming the image sensor based on some implementations of the disclosed technology.

Figure 8A:
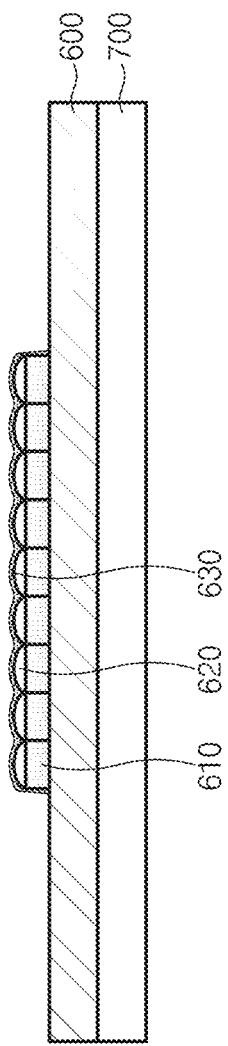

In step S10 of FIG. 8A, the wiring layer 700 and the substrate 600 may be stacked, and the optical filter 610 and the on-chip lens 620 may be stacked and formed to correspond to each pixel. In addition, the on-chip lens protection layer 630 may be formed to cover the upper portion of the on-chip lens 620.

Figure 8B:
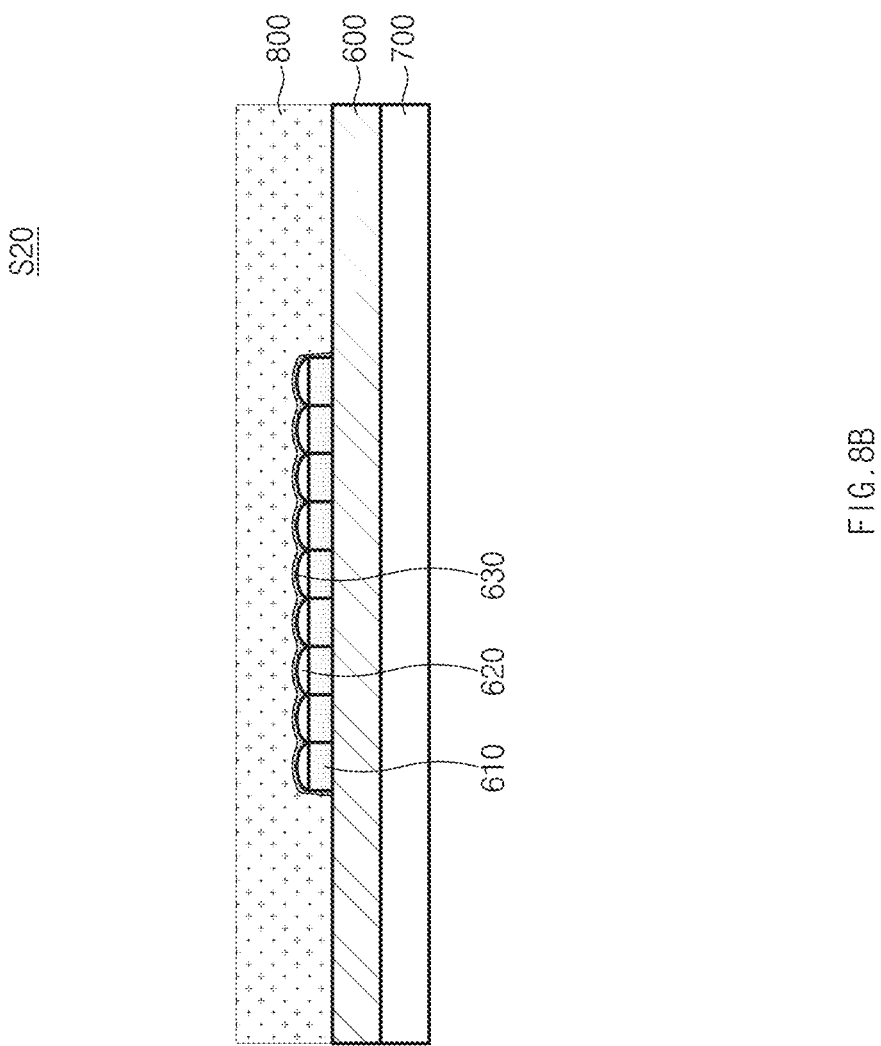

In step S20 of FIG. 8B, a first sacrificial layer 800 may be formed over the substrate 600 and the on-chip lens protection layer 630 through deposition or coating processing. The first sacrificial layer 800 may be identical in height to at least one of the first moving electrode 310, the second moving electrode 320, the first fixed electrode 330, and the second fixed electrode 340. For example, the first sacrificial layer 800 may include a carbon-containing Spin On Carbon (SOC).

In step S30 of FIG. 8C, a first mask (not shown) may be disposed over the first sacrificial layer 800. Here, the first mask may define the first moving electrode 310, the second moving electrode 320, the first fixed electrode 330, and the second fixed electrode 340. The first sacrificial layer 800 may be etched using the first mask (not shown) as an etch mask, resulting in formation of a patterned first sacrificial layer 800'. The patterned first sacrificial layer 800' may include at least one hole needed to form the first moving electrode 310, the second moving electrode 320, the first fixed electrode 330, and the second fixed electrode 340. If formation of the patterned first sacrificial layer 800' is completed, the first mask (not shown) may be removed.

Figure 8D:
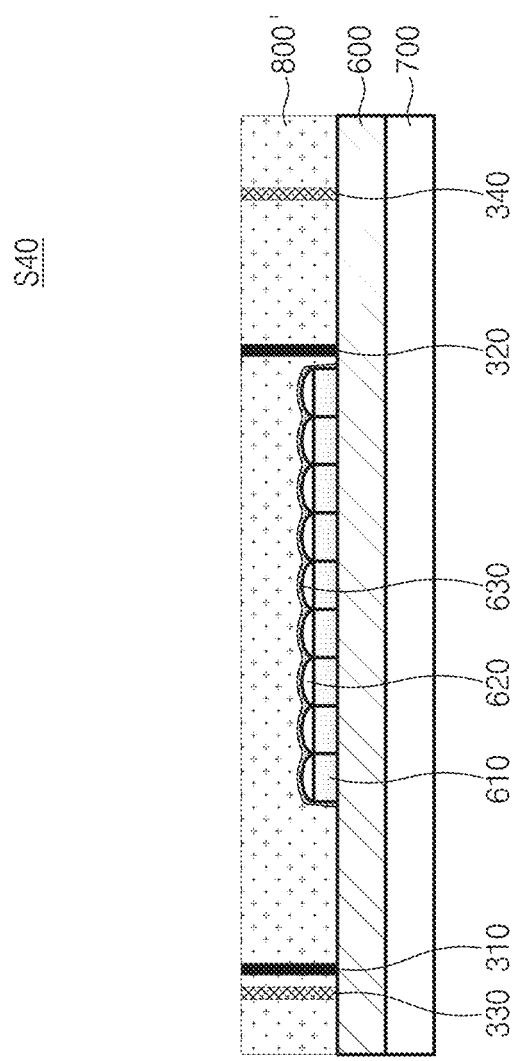

In step S40 of FIG. 8D, a metal material may be formed to fill the hole of the patterned first sacrificial layer 800' through execution of a Physical Vapor Deposition (PVD) process, a Chemical Vapor Deposition (CVD) process, a plating process, or a filling process. If the hole of the patterned first sacrificial layer 800' is completely gap-filled with the metal material, a Chemical Mechanical Polishing (CMP) process may be performed on top surfaces of the patterned first sacrificial layer 800' and the metal material, and the resultant first sacrificial layer 800' and the metal material may be planarized, such that the first moving electrode 310, the second moving electrode 320, the first fixed electrode 330, and the second fixed electrode 340 can be formed. Although the mechanical element by which the first moving electrode 310 is coupled to the second moving electrode 320 is omitted from FIG. 8D, the scope or spirit of the disclosed technology is not limited thereto, and it should be noted that the above-mentioned mechanical element may be formed in advance prior to the beginning of step S20 and connection to such mechanical element may be carried out in a gap-filling process of such metal materials.

Figure 8E:
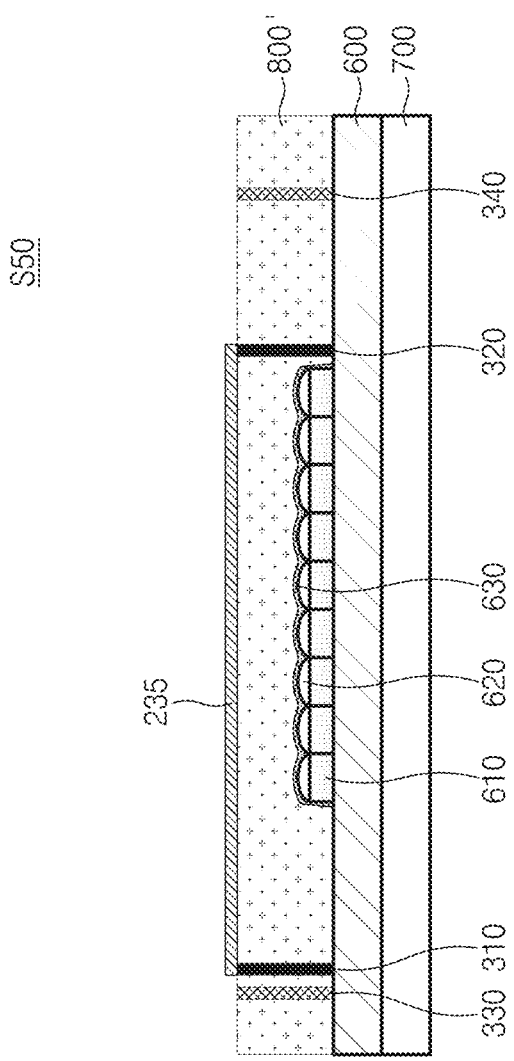

In step S50 of FIG. 8E, a transparent conductive material 235 may be formed in a region corresponding to the light field lens array 200 (i.e., a region ranging from the first moving electrode 310 to the second moving electrode 320). To this end, a transparent conductive material may be deposited over the first moving electrode 310, the second moving electrode 320, the first fixed electrode 330, the second fixed electrode 340, and the patterned first sacrificial layer 800', a second mask (not shown) defining the light field lens array 200 may be disposed and etched, resulting in formation of the transparent conductive material 235. Thereafter, the second mask (not shown) may be removed. In addition, a bonding material may be deposited not only between the transparent conductive material 235 and the first moving electrode 310, but also between the transparent conductive materials 235.

Figure 8F:
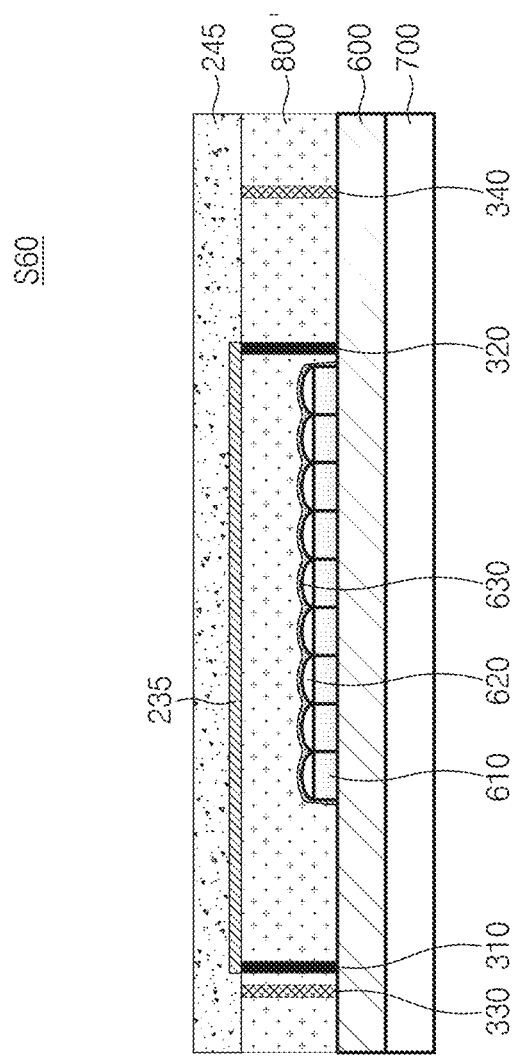

In step S60 of FIG. 8F, a transparent organic material 245 may be formed over the first fixed electrode 330, the second fixed electrode 340, the patterned first sacrificial layer 800', and the transparent conductive material 235 through deposition or coating processing.

Figure 8G:
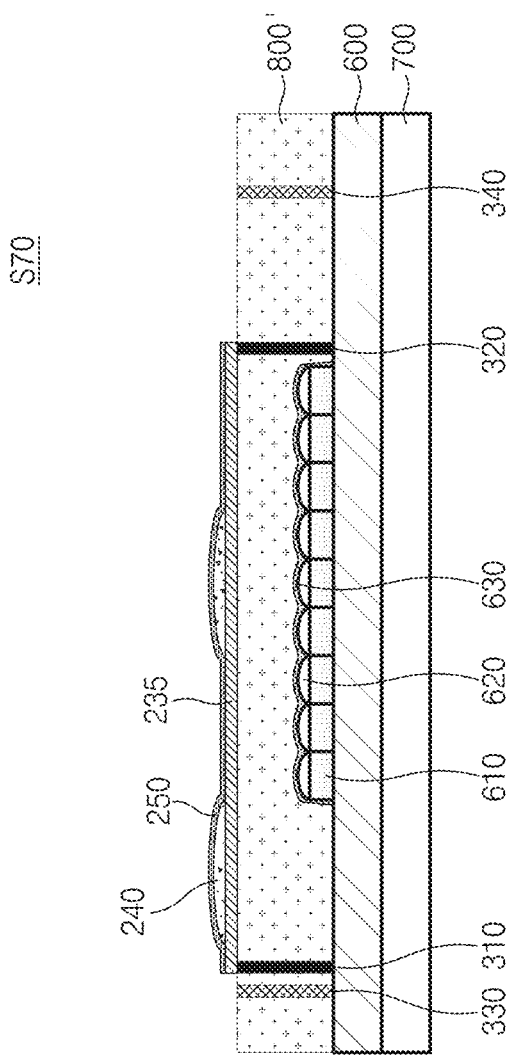

In step S70 of FIG. 8G, a third mask (not shown) defining the light field lenses may be disposed over the transparent organic material 245. The transparent organic material 245 may be etched using the third mask (not shown) as an etch mask, resulting in formation of the light field lenses 240. The light field lens protection layer 250 may be formed over the transparent conductive material 235 and the light field lenses 240.

Figure 8H:
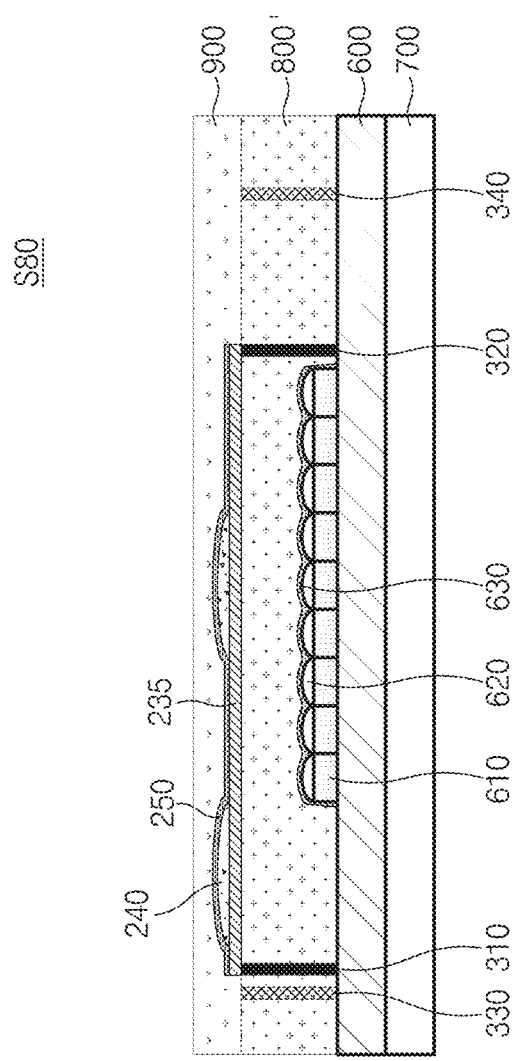
Figure 8I:
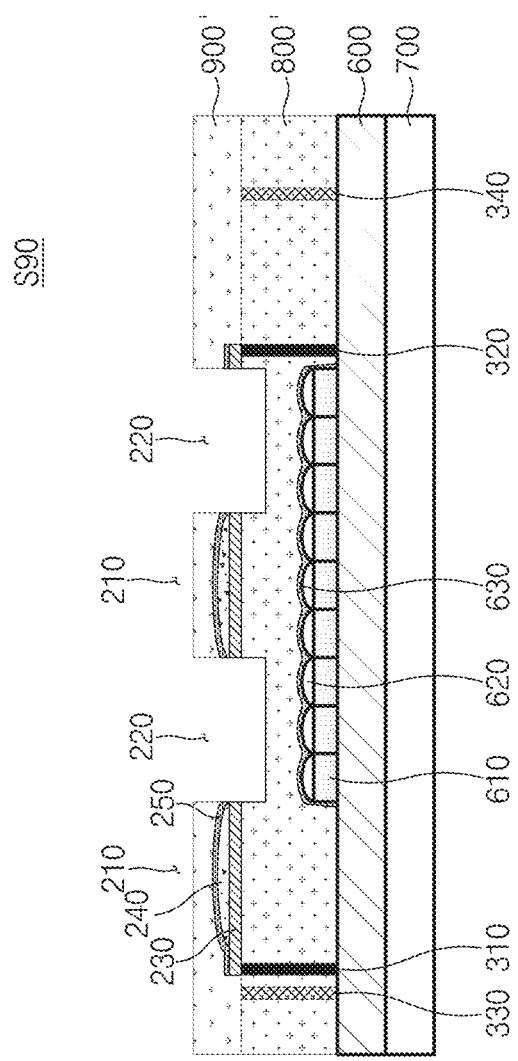

In step S80 of FIG. 8H, a second sacrificial layer 900 may be disposed over the first fixed electrode 330, the second fixed electrode 340, the patterned first sacrificial layer 800', and the light field lens array protection layer 250. For example, the second sacrificial layer 900 may include a carbon-containing Spin On Carbon (SOC).

In step S90 of FIG. BI, a fourth mask (not shown) defining the open region 220 may be disposed over the second sacrificial layer 900. The second sacrificial layer 900, the light field lens protection layer 250, the transparent conductive material 235, and the patterned first sacrificial layer 800' may be partially etched using the fourth mask (not shown) as an etch mask, such that the open region 220 can be formed, and the support plate 230, the light field lens 240, and the light field lens protection layer 250 that are contained in the lens region 210 can also be formed. If formation of the open region 220 is completed, the fourth mask (not shown) formed over the patterned second sacrificial layer 900' may be removed.

Figure 8J:
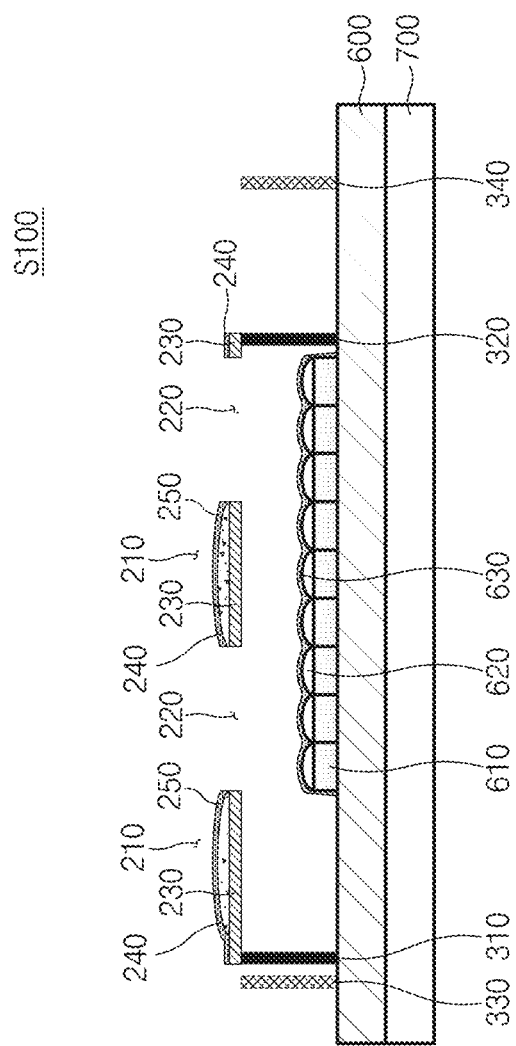

In step S100 of FIG. 8J, the plasma process may be carried out such that the patterned first sacrificial layer 800' and the patterned second sacrificial layer 900' may be removed. In this case, the plasma process may be carried out using gas (e.g., $O_2$, $N_2$, $H_2$, CO, $CO_2$, or $CH_4$) including at least one of oxygen, nitrogen, and hydrogen. In this case, the above-mentioned processes will hereinafter be described using the $O_2$ plasma process as an example. If the $O_2$ plasma process is carried out upon the resultant structure, oxygen radicals (O*) may be combined with carbons of the patterned first sacrificial layer 800' and carbons of the patterned second sacrificial layer 900', resulting in formation of CO or $CO_2$. As a result, the patterned first sacrificial layer 800' and the patterned second sacrificial layer 900' can be removed.

As is apparent from the above description, the image sensor based on some implementations of the disclosed technology can simultaneously acquire a light field image and a normal image by adding a minimum number of mechanical configurations to a top surface of the image sensor, without adding a thick mechanical configuration to the upper portion of the image sensor.

The embodiments of the disclosed technology may provide a variety of effects capable of being directly or indirectly recognized through the above-mentioned patent document.

Although a number of illustrative embodiments of the disclosed technology have been described, it should be understood that various other modifications and embodiments can be made based on what is described and illustrated in this patent document.

What is claimed is:

1. An image sensing device comprising:
   a pixel array configured to include a first pixel group and a second pixel group that are contiguous to each other, each of the first pixel group and second pixel group including a plurality of imaging pixels to convert light into pixel signals; and
   a light field lens array disposed over the pixel array to direct light to the imaging pixels and configured as a moveable structure that is operable to move between a first position and a second position in a horizontal direction by a predetermined distance corresponding to a width of the first pixel group or a width of the second pixel group, the light field lens array configured to include one or more lens regions each including a light field lens and one or more open regions formed without the light field lens to enable both light field imaging and conventional imaging,
   wherein the first pixel group generates a conventional image by detecting incident light through the light field lens array disposed at the first position and generates a light field image by detecting incident light through the light field lens array disposed at the second position.

2. The image sensing device according to claim 1, wherein a number of the plurality of imaging pixels arranged in the first pixel group is identical to a number of the plurality of imaging pixels arranged in the second pixel group.

3. The image sensing device according to claim 1, wherein the first pixel group and the second pixel group are alternately arranged in a first direction or in a second direction perpendicular to the first direction.

4. The image sensing device according to claim 1, wherein:
   the light field lens array is structured so that the one or more lens regions and the one or more open regions are alternately arranged in a first direction or in a second direction perpendicular to the first direction.

5. The image sensing device according to claim 1, wherein the width of the first pixel group or the width of the second pixel group corresponds to a width of the lens region or a width of the open region.

6. The image sensing device according to claim 1, wherein each of the lens region and the open region of the light field lens array is identical in size to the first pixel group or the second pixel group.

7. The image sensing device according to claim 1, wherein the first pixel group and the second pixel group are configured to overlap with the open region and the lens region, respectively, upon placing the light field lens array at the first position.

8. The image sensing device according to claim 1, wherein the first pixel group and the second pixel group are configured to overlap with the lens region and the open region, respectively, upon placing the light field lens array at the second position.

9. The image sensing device according to claim 1, wherein a sum of an area of the lens regions of the light field lens array overlapping with the pixel array upon placing the light field lens array at the first position and an area of the lens regions of the light field lens array overlapping with the pixel array upon placing the light field lens array at the second position is identical in size to an area of the pixel array.

10. The image sensing device according to claim 1, wherein the horizontal direction includes a row direction or a column direction of the pixel array.

11. The image sensing device according to claim 1:
wherein the light field lens is configured to be mapped to a plurality of pixels in the first pixel group or the second pixel group; and
wherein the one or more lens region further includes a support plate configured to support the light field lens at a lower portion of the light field lens.

12. The image sensing device according to claim 1, further comprising:
a lens driver configured to move the light field lens array to the first position or the second position; and
a lens controller configured to provide the lens driver with a voltage for moving the light field lens array.

13. The image sensing device according to claim 12, wherein the lens driver includes:
first and second moving electrodes connected to the light field lens array, and configured to receive a first voltage; and
a first fixed electrode and a second fixed electrode configured to respectively receive any one of the first voltage and a second voltage and the other one of the first voltage and the second voltage to move the light field lens array.

14. The image sensing device according to claim 13, wherein the lens controller includes:
a first controller configured to transmit the first voltage to the first moving electrode, and to transmit the first voltage or the second voltage to the first fixed electrode; and
a second controller configured to transmit the first voltage to the second moving electrode, and to transmit the first voltage or the second voltage to the second fixed electrode.

15. The image sensing device according to claim 13, wherein:
the first and second moving electrodes extends along sides facing each other in the light field lens array; and
a top surface of each of the first and second moving electrodes is attached to a bottom surface of the light field lens array.

16. An image sensing device comprising:
a pixel array including a plurality of pixels; and
a light field lens array disposed over the pixel array and configured to move between a first position and a second position in a horizontal direction by a predetermined distance, the light field lens array configured to include one or more lens regions each including a light field lens and one or more open regions formed without the light field lens,
wherein at least one of the plurality of pixels is configured to:
receive light through the one or more lens regions upon placing the light field lens array at the first position, and
receive light through the one or more open regions upon placing the light field lens array at the second position, and
wherein the at least one of the plurality of pixels generates a light field image by detecting incident light through the light field lens array disposed at the first position and generates a conventional image by detecting incident light through the light field lens array disposed at the second position.

17. The image sensing device according to claim 16, wherein the one or more lens regions include light field lens spaced apart from the pixel array.

18. The image sensing device according to claim 16, wherein the one or more open regions are formed between adjacent lens regions such that the one or more lens regions are periodically arranged with the one or more open regions therebetween.

19. The image sensing device according to claim 18, wherein the one or more open regions are periodically arranged in the same pattern as the one or more lens regions.

* * * * *